United States Patent [19]

Oguchi et al.

[11] Patent Number: 5,220,010
[45] Date of Patent: Jun. 15, 1993

[54] METHOD FOR PREPARING ALKOXYPHTHALOCYANINE

[75] Inventors: Takahisa Oguchi; Kenichi Sugimoto; Shin Aihara; Hisato Itoh, all of Yokohama; Mansuke Matsumoto, Itami; Toshihiro Masaoka; Masakazu Nakamura, both of Osaka, all of Japan

[73] Assignees: Mitsui Toatsu Chemicals, Incorporated, Tokyo; Yamamoto Chemicals, Incorporated, Yao, both of Japan

[21] Appl. No.: 813,179

[22] Filed: Dec. 24, 1991

[30] Foreign Application Priority Data

Dec. 26, 1990 [JP] Japan .................. 2-413909
Jul. 17, 1991 [JP] Japan .................. 3-176604

[51] Int. Cl.$^5$ .......................................... C09B 47/067
[52] U.S. Cl. ................................. 540/143; 540/142
[58] Field of Search .......................................... 540/143

[56] References Cited

FOREIGN PATENT DOCUMENTS 0253169 1/1988 European Pat. Off. .
0373643 6/1990 European Pat. Off. .

*Primary Examiner*—Thurman K. Page
*Assistant Examiner*—Jyothsna Venkat
*Attorney, Agent, or Firm*—Oblon, Spivak, McClelland, Maier & Neustadt

[57] ABSTRACT

There is here disclosed a method for preparing an alkoxyphthalocyanine represented by the formula (1):

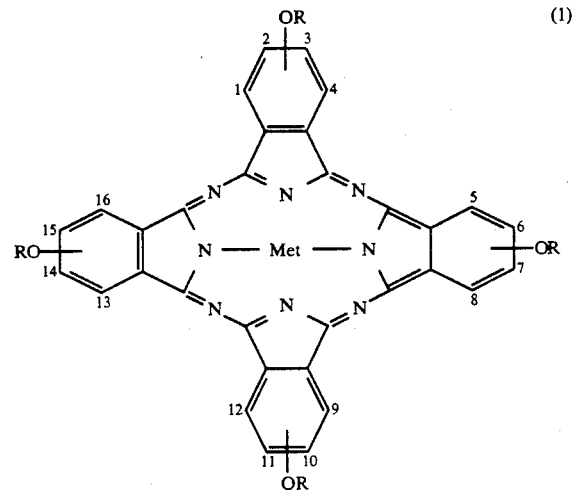

6 Claims, No Drawings

METHOD FOR PREPARING ALKOXYPHTHALOCYANINE

BACKGROUND OF THE INVENTION (i) Field of the Invention

The present invention relates to a method for preparing an alkoxyphthalocyanine which is useful as a novel recording material for optical discs or an intermediate of a novel phthalocyanine compound.

(ii) Description of the Related Art

Manufacturing methods of a 8-position substituted tetraalkoxyphthalocyanine having the formula (1):

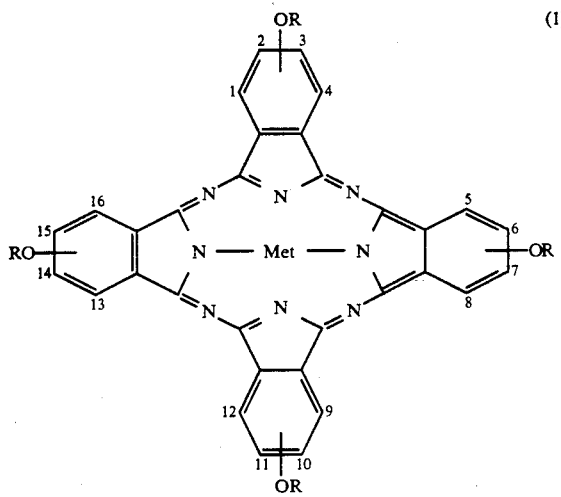

wherein —OR groups are substituted at the 2- or 3-position, the 6- or 7-position, the 10- or 11-position and the 14- or 15-position, are described in various literature. For example, the manufacturing process of 2,6,10,14-tetra-isopropoxyphthalocyanine is described in NOUVEAU JOURNAL DE CHIMIE, Vol. 6, p. 653–658 (1982). In this process, a diiminoisoindoline is mixed with N,N-dimethylaminoethanol and reaction is then carried out at 140° C. for 22 hours. However, when this process is employed, the yield of the product is as low as 38%. Furthermore, as an example of the manufacturing process of an α-position substituted tetraalkoxyphthalocyanine which is substituted with -OR groups at the 1- or 4-position, the 5- or 8-position, the 9- or 12-position and the 13- or 16-position of the formula (1), Japanese Patent Laid-Open No. 62878/1991 (EP-0373643) discloses the manufacturing process of a 1,5,9,13-tetraalkoxyphthalocyanine in which n-amyl alcohol is mixed with phthalonitrile, palladium chloride, 1,8-diazabicyclo[5.4.0]-7-undecene (hereinafter abbreviated to "DBU"), and reaction is then carried out under reflux. Also in this process, however, the yield of the product is at a low level of 20%, and therefore the process is not industrially utilizable.

SUMMARY OF THE INVENTION

An object of the present invention is to provide a method for preparing an α-position substituted tetraalkoxyphthalocyanine, particularly an alkoxyphthalocyanine having a large steric hindrance in a high yield without being contaminated with a by-product such as a metal-free phthalocyanine.

The present inventors have intensively investigated so as to achieve the above-mentioned object, and as a result, the present invention has been completed. That is, the present invention is directed to a method for preparing a tetraalkoxyphthalocyanine represented by the formula (3)

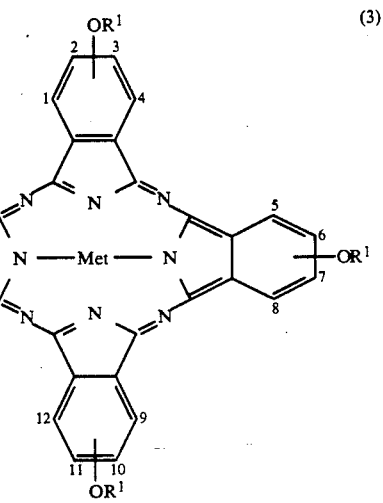

wherein each of $R^1$s is independently a secondary alkyl group having 3 to 20 carbon atoms, Met is a divalent metal atom or an metal oxide, and the substitution positions of —$OR^1$s are the 1- or 4-position, the 5- or 8-position, the 9- or 12 position, and the 13- or 16-position, which comprises the steps of heating an alcohol solution or suspension of one to four kinds of 3-alkoxyphthalonitriles represented by the formula (2):

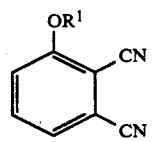

wherein $R^1$ is a secondary alkyl group having 3 to 20 carbon atoms, and an organic base to 90°–120° C., adding a metal or a metal derivative at the same temperature, and then reacting them at 90°–120° C.; and a method for preparing a tetraalkoxyphthalocyanine represented by the formula (5):

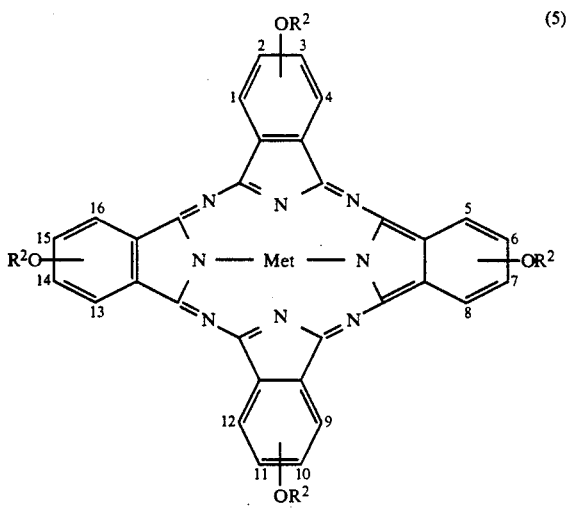

(5)

wherein each of R²s is independently a secondary alkyl group having 3 to 20 carbon atoms, Met is a divalent metal atom or an metal oxide, and the substitution positions of —OR²s are the 1- or 4-position, the 5- or 8-position, the 9- or 12-position, and the 13- or 16-position, which comprises the step of reacting one to four kinds of diiminoisoindolines represented by the formula (4):

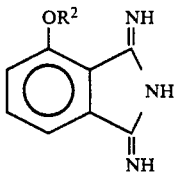

(4)

wherein R² is a secondary alkyl group having 3 to 20 carbon atoms, with a metal or a metal derivative in the presence or absence of an organic base in an aliphatic alcohol solvent having a boiling point of 150° C. or more and 6 or more carbon atoms.

According to the present invention, the synthesis of an α-tetraalkoxyphthalocyanine having a large steric hindrance can be accomplished in a high yield by heating a mixture of phthalonitrile and an organic base in an alcohol to 90°-120° C., and then adding a metal derivative at the same temperature, or alternatively by reacting a diiminoisoindoline with a metal derivative at 150°-300° C. in an aliphatic alcohol having 6 or more carbon atoms. Furthermore, the production ratio of α-tetraalkoxyphthalocyanine isomers can be controlled by changing the starting materials and modifying the addition manner of the organic base.

DETAILED DESCRIPTION OF THE PREFERRED EMBODIMENT

The preparation method of the present invention is characterized by combining the selection of starting materials and the accurate control of reaction conditions to remarkably improve the yield of an α-position substituted tetraalkoxyphthalocyanine.

In the first place, reference will be made to a method in which a 3-alkoxyphthalonitrile of the formula (2) is used. This preparation method is characterized by dissolving or suspending the 3-alkoxyphthalonitrile and an organic base in an alcohol, heating the solution or suspension to 90°-120° C., and adding a metal or a metal derivative, and then carrying out reaction at 90°-120° C.

A secondary alkyl group represented by R¹ in the above-mentioned formula (2) or (3) is a hydrocarbon or a halogenated hydrocarbon having 3 to 20 carbon atoms, and the preferable alkyl group is a group having 2 to 4 of secondary to quaternary carbon atoms in all. Typical examples of the alkyl group include hydrocarbon groups such as an iso-propyl group, sec-butyl group, tert-butyl group, neo-pentyl group, 1,2-dimethypropyl group, cyclohexyl group, 1,3-dimethylbutyl group, 1-isopropylpropyl group, 1,2-dimethylbutyl group, 1,4-dimethylpentyl group, 2-methyl-1-isopropylpropyl group, 1-ethyl-3-methylbutyl group, 3-methyl-1-iso-propylbutyl group, 2-methyl-1-iso-propylbutyl group and 1-t-butyl-2-methylpropyl group, and a halogenated alkyl group such as a 1,1,1,3,3,3-hexafluoro-2-propyl group.

Examples of a divalent metal represented by Met in the formula (3) include Cu, Zn, Mn, Fe, Co, Ni, Ru,, Rh, Pd, Pt and Pb, and examples of an metal oxide represented by the Met in the formula (3) include VO and TiO. The present invention is particularly effective for the preparation of a phthalocyanine in which Pd or Pt of the above-mentioned metals and their metal derivatives is a central metal.

Conditions for the formation of a phthalocyanine ring are to heat 1 to 4 kinds of 3-alkoxyphthalonitriles (2) and the organic base to 90°-120° C. in the alcohol solvent, to add the metal or the metal derivative at the same temperature, and to carry out reaction at 90°-120° C. In particular, in the case of a metal such as Pd or Pt, when the addition temperature of the metal derivative is in excess of 120° C., a metal-free phthalocyanine is formed as a by-product, and when it is less than 90° C., a linear phthalocyanine which is not cyclic is formed, and in these cases, yield deteriorates. Furthermore, also in the case that the metal derivative is previously mixed with the 3-alkoxyphthalonitrile and the organic base and they are then heated and then reacted, the linear phthalocyanine is formed and the yield also deteriorates. Moreover, it is usually preferable that the reaction is carried out under a nitrogen atmosphere.

As the solvent, an alcohol having a boiling point of 90° C. or more, preferably 100° C. or more is good. Typical examples of the alcohol include n-propyl alcohol, n-butyl alcohol, n-amyl alcohol, n-hexyl alcohol, n-heptyl alcohol and n-octyl alcohol which are mentioned in "ORGANIC SOLVENT", J. A. Riddick and W. B. Bunger, WILEY-INTERSCIENCE, 1970 and "THE MERCK INDEX", 11th edition, MERCK & CO., 1989. The amount of the alcohol to be used is from 1 to 100 times by weight, preferably from 5 to 20 times by weight as much as that of the 3-alkoxyphthalonitrile.

Examples of the metal or the metal derivative which can be used in the reaction include Ti, V, Mn, Fe, Co, Ni, Cu, Zn, Ru, Rh, Pb, Pd and Pt as well as halides, acetates, carboxylic acid derivatives, sulfates, nitrates, carbonyl compounds, and oxides thereof. Preferable examples thereof include palladium chloride, palladium bromide, palladium acetate, platinum chloride, platinum bromide and platinum acetate. The amount of the metal or the metal derivative to be used is ¼ mole or more, preferably from ¼ to ½ per mole of the 3-alkoxyphthalonitrile.

As the organic base, there can be used DBU or 1,5-diazabicyclo[4.3.0]-5-nonene (hereinafter abbreviated to "DBN"). The amount of the base to be used is equimolar with or more than that of the 3-alkoxyphthalonitrile which is the raw material, and it is preferably from 1 to 1.5 moles per mole of the 3-alkoxyphthalonitrile.

The 3-alkoxyphthalonitrile (2) of the raw material which can be used in the method of the present invention can be synthesized by the procedure of the following formula (6):

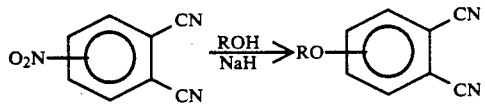
(6)

3-nitrophthalonitrile which is a starting material is available from Tokyo Kasei Co., Ltd. The synthesis of the 3-alkoxyphthalonitrile from 3-nitrophthalonitrile can be effected in accordance with a process described in NOUVEAU JOURNAL DE CHIMIE, Vol. 6, No. 12, p. 653-658, 1982. That is, an alcohol is converted into sodium alkoxide by the use of sodium hydride, and sodium alkoxide is then reacted with 3-nitrophthalonitrile at a temperature of from 0° to 100° C., thereby obtaining the desired 3-alkoxyphthalonitrile.

It can be considered that the α-position substituted tetraalkoxyphthalocyanine obtained by the present invention has four isomers represented by the following formulae (7) to (10):

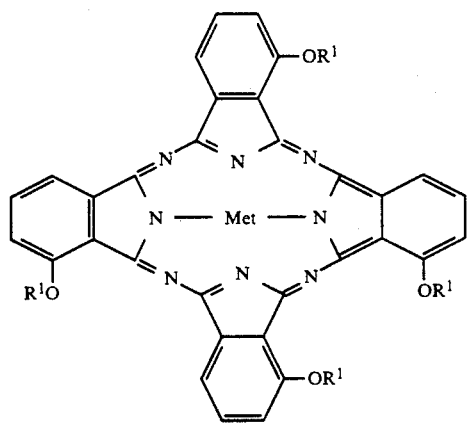
(7)

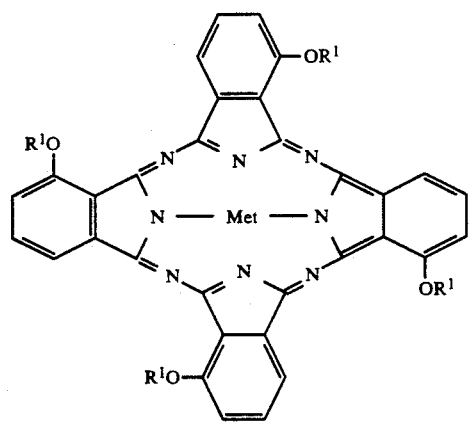
(8)

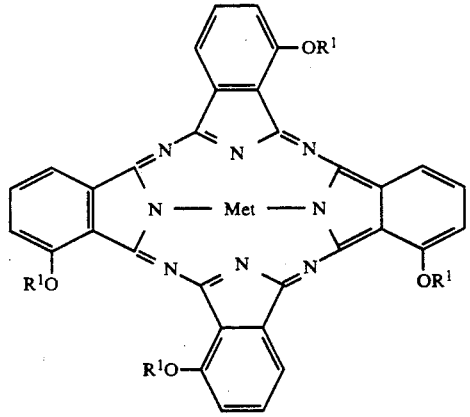
(9)

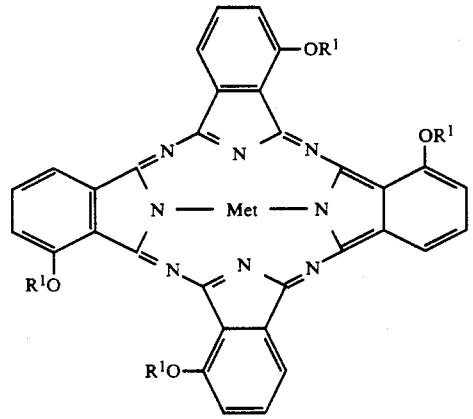
(10)

wherein $R^1$ and Met are identical with $R^1$ and Met in the above-mentioned formula (3). Another feature of the preparation method in which the phthalonitrile is used as the raw material is that the ratio of the isomers can be controlled. That is, it has been apparent that the synthesized phthalocyanines (7) and (8) are present as the main products, and a ratio between these isomers (7) and (8) is from 60/40 to 40/60 and they are produced in substantially equal amounts. In the case that the total value of the existent ratios of the isomers (7) and (8) is less than 100, the production of the isomers (9) and (10) is observed. According to the present invention, the specific isomers can be selectively formed. Making a comparison between solubilities of the isomers (7) and (8) in the organic solvent, the solubility of the isomer (7) is higher than that of the isomer (8). Therefore, the isomer (7) is advantageous in a solvent coating process and the isomer (8) is convenient in a field in which stability to the solvent is required.

Next, reference will be made to the case that a diiminoisoindoline of the formula (4) is used. The feature of this method is characterized by reacting the diiminoisoindoline with a metal or a metal derivative in an aliphatic alcohol solvent having a boiling point of 150° C. or more and 6 or more carbon atoms.

A secondary alkyl group represented by $R^2$ in the above-mentioned formula (4) or (5) is a hydrocarbon or a halogenated hydrocarbon having 3 to 20 carbon atoms, and the preferable alkyl group is a group having 2 to 4 of secondary to quaternary carbon atoms in all. Typical examples of the alkyl group include hydrocarbon groups such as an iso-propyl group, sec-butyl group, tert-butyl group, neo-pentyl group, 1,2-dimethylpropyl group, cyclohexyl group, 1,3-dimethylbutyl group, 1-isopropylpropyl group, 1,2-dimethylbutyl group, 1,4-dimethylpentyl group, 2-methyl-1-isopropylpropyl group, 1-ethyl-3-methylbutyl group, 3-methyl-1-iso-propylbutyl group, 2-methyl-1-iso-propylbutyl group and 1-t-butyl-2-methylpropyl group, and a halogenated alkyl group such as a 1,1,1,3,3,3-hexafluoro-2-propyl group.

Examples of a divalent metal represented by Met in the formula (5) include Cu, Zn, Mn, Fe Co, Ni, Ru, Rh, Pd, Pt and Pb, and examples of are metal oxide represented by the Met in the formula (5) include VO and TiO. The present invention is particularly effective for the preparation of a phthalocyanine in which Pd or Pt of the above-mentioned metals and metal derivatives is a central metal.

Conditions for the formation of a phthalocyanine ring are to heat 1 to 4 kinds of diiminoisoindolines (4) and the metal or the metal derivative, and to carry out react at 150°–300° C. in an aliphatic alcohol solvent having a boiling point of 150° C. or more and 6 or more carbon atoms. The diiminoisoindoline is poorer in solubility as compared with the 3-alkoxyphthalonitrile, and so when the diiminoisoindoline is in the state of a suspension, the yield of the product deteriorates. In addition, even when a solvent in which the diiminoisoindoline can be dissolved is used, the progress of the reaction is too slow to be industrially practical, if the boiling point of the solvent is less than 150° C. The present inventors have investigated with the intention of improving the yield of the phthalocyanine from the diiminoisoindoline, and as a result, they have found that the phthalocyanine can be synthesized in a short period of time in the high yield by using, as the solvent, an aliphatic alcohol having 6 or more carbon atoms which has a boiling point of 150° C. or more and which can dissolve the diiminoisoindoline.

As the solvent, there are described examples of the aliphatic alcohol having a boiling point of 150° C. or more and having 6 or more carbon atoms in "ORGANIC SOLVENT", J. A. Riddick and W. B. Bunger, WILEY-INTERSCIENCE CO., LTD., 1970 and "THE MERCK INDEX", 11th edition, MERCK & CO., 1989. Preferable examples of the solvent include 1-hexanol, cyclohexanol, 1-heptanol, 2-heptanol, 1-octanol and 2-ethyl-1-hexanol. The amount of the alcohol solvent to be used is from 1 to 100 times by weight, preferably 5 to 20 times by weight as much as that of the diiminoisoindoline.

Examples of the metal or the metal derivative which can be used in the reaction include Ti, V, Mn, Fe, Co, Ni, Cu, Zn, Ru, Rh, Pb, Pd and Pt as well as halides, carboxylic acid derivatives, sulfates, nitrates, carbonyl compounds, and oxides thereof. Preferable examples thereof include palladium chloride, palladium bromide, palladium acetate, platinum chloride, platinum bromide and platinum acetate. The amount of the metal or the metal derivative to be used is ¼ mole or more, preferably from ¼ to ½ per mole of the diiminoisoindoline.

In addition, as a catalyst for the ring formation reaction, there may be added an organic base, for example, a strongly basic auxiliary such as DBU or DBN. The amount of the auxiliary to be used is from 0.1 to 10 moles, preferably from 0.5 to 2 moles per mole of the diiminoisoindoline which is the raw material.

The diiminoisoindoline (4) which can be used as the raw material in the method of the present invention can be synthesized in accordance with the procedure represented by the following formula (11):

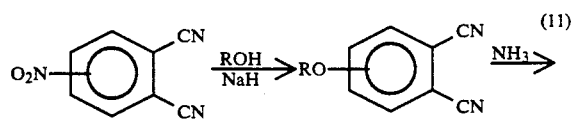
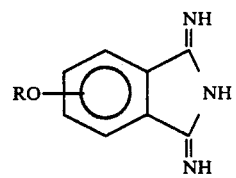

The process until the synthesis of the 3-alkoxyphthanonitrile from 3-nitrophthalonitrile of the starting material is the same as in the formula (6). Afterward, the reaction is carried out in the alcohol, for example, while ammonia is blown into the reaction system, thereby obtaining the desired diiminoisoindoline (4).

It is considered that the phthalocyanine synthesized from the diiminoisoindoline also has four isomers, as in the case of the phthalocyanine synthesized from the 3-alkoxyphthanonitrile raw material. Another feature of the preparation method from the diiminoisoindoline raw material is that the o-position substituted tetraalkoxyphthalocyanine can be obtained in a different isomer ratio than in the preparation method using the phthanonitrile raw material. That is, after the organic base is added at a lower temperature (50° C. or less), a reaction temperature is elevated to 150°–300° C., and in this case, the isomers represented by the formulae (12) and (13)

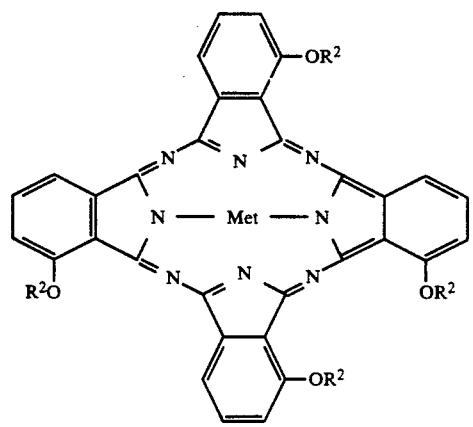

-continued

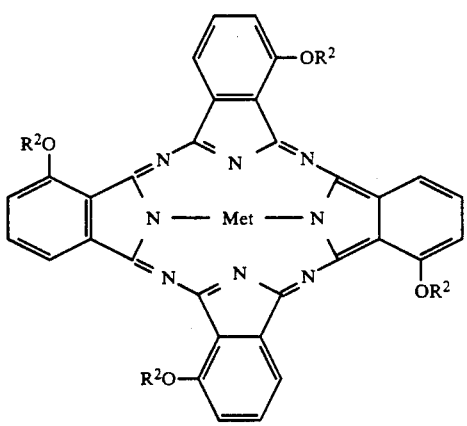
(13)

are formed in existent ratios of 85-95 of the isomer represented by the formula (12) and 5-15 of the isomer having the formula (13). At this time, the total value of the existent ratios of the formulae (12) and (13) is 100or less. When the total number is less than 100, the production of isomers represented by the formulae (14) and (15):

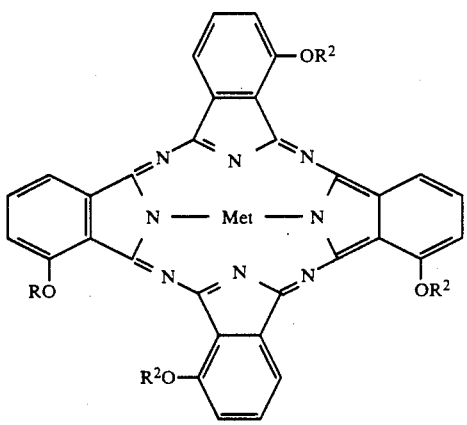
(14)

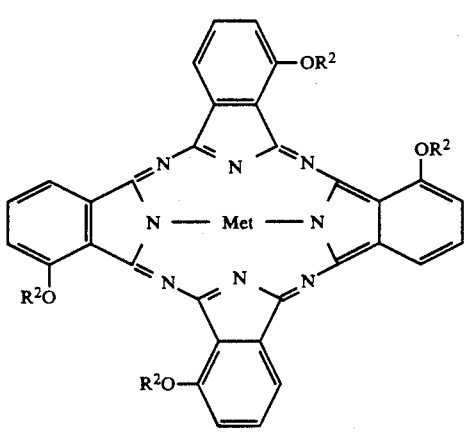
(15)

wherein $R^2$ and Met are identical with $R^2$ and Met in the above-mentioned formula (5), is observed.

On the other hand, when the organic base is added at the reaction temperature (150°–300° C.), or when the organic base is not used, the isomer of the formula (12) and the isomer of the formula (13) are formed in existent ratio of 75-85 and an existent ratio of 15-25, respectively. The total value of both the existent ratios is 100 or less. When the total value is less than 100, the production of the isomers represented by the formulae (14) and (15) is observed. Making a comparison between solubilities of the isomers having the formulae (12) and (13) in the organic solvent, the solubility of the isomer of the formula (12) is higher than that of the isomer of the formula (13). Therefore, the isomer of the formula (12) is advantageous in a solvent coating process and the isomer of the formula (13) is convenient in a field in which stability to the solvent is required.

As understood from the foregoing, in the synthesis of the α-position substituted tetraalkoxyphthalocyanine from the diiminoisoindoline raw material, the phthalocyanine can be obtained in a different isomer ratio than in the preparation method using the 3-alkoxyphthanonitrile raw material. These synthesis techniques can be selectively utilized in accordance with a desired application.

Now, the present invention will be described in more detail in reference to examples, but the present invention should not be limited only to these examples.

EXAMPLE 1

22.8 g (100 mmol) of phthalonitrile represented by the formula (16)

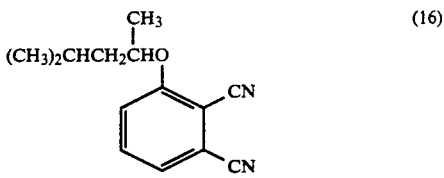
(16)

15.2 g (100 mmol) of DBU and 125 g of n-amyl alcohol were mixed at room temperature, and the mixture was then heated up to 110° C. Next, 5.3 g (30 mmol) of palladium chloride were added thereto at the same temperature, and reaction was then carried out at 110°–120° C. for 8 hours. After cooled to room temperature, the reaction solution was filtered to remove insolubles therefrom, and the resultant filtrate was then concentrated under reduced pressure. Afterward, 500 ml of methanol were added thereto, and the precipitated crystals were filtered and then washed with 100 ml of methanol. Next, the crystals were dried at 60° C. to obtain 22.7 g of a mixture of isomers represented by the formulae (17), (18), (19) and (20):

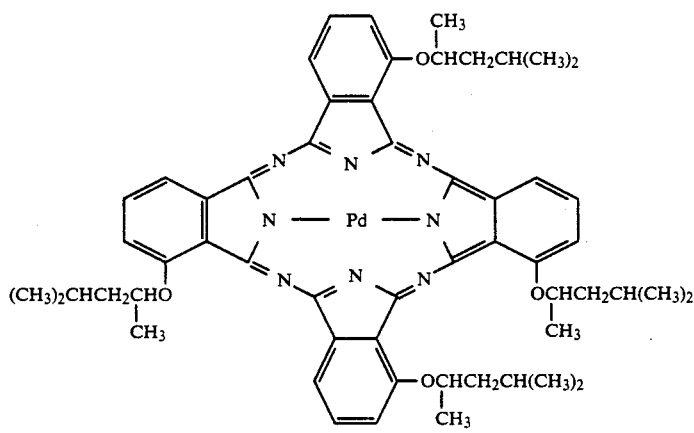
(17)
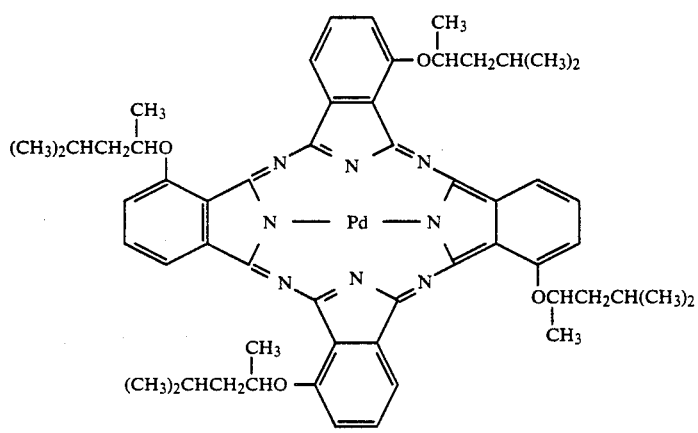
(18)
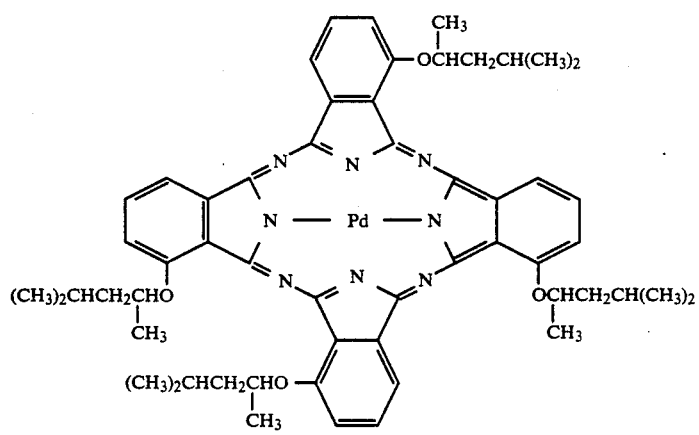
(19)

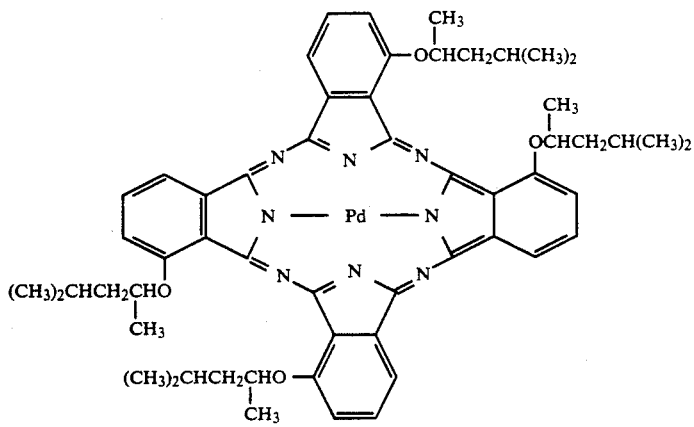

(20)

In this case, the yield of the mixture was 90%. The mixture had a maximum absorption wave length $\lambda_{max}$ of 687 nm and $\epsilon_{max}$ of $3.0 \times 10^5$ $g^{-1}cm^2$ (toluene). The production ratio of the isomers was (17)/(18)/(19)/(20)=(50/48/1/1 in accordance with an area ratio on a liquid chromatogram.

EXAMPLE 2

24.2 g (100 mmol) of phthalonitrile represented by the formula (21)

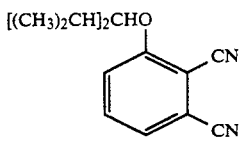

(21)

15.2 g (100 mmol) of DBU and 100 g of n-amyl alcohol were mixed at room temperature, and the mixture was then heated up to 90° C. Next, 5.3 g (30 mmol) of palladium chloride were added thereto at the same temperature, and reaction was then carried out at 90°-100° C. for 12 hours. After cooled to room temperature, the reaction solution was filtered to remove insolubles therefrom, and the resultant filtrate was then concentrated under reduced pressure. Afterward, 400 ml of methanol were added thereto, and the precipitated crystals were filtered and then washed with 100 ml of methanol. Next, the crystals were dried at 60° C. to obtain 24.6 g of a mixture of isomers represented by the formulae (22), (23), (24) and (25):

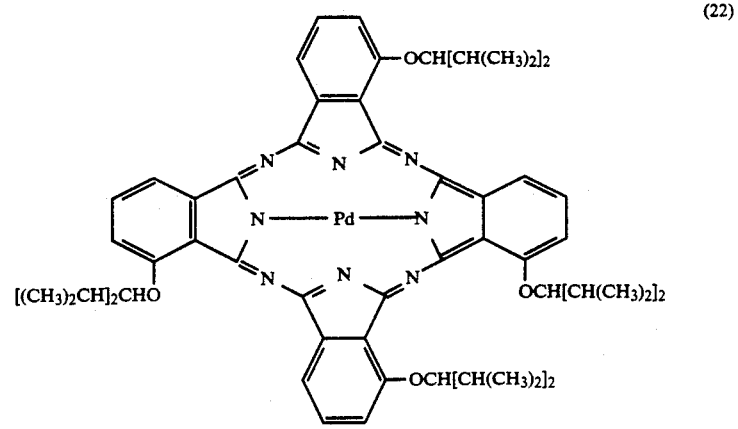

(22)

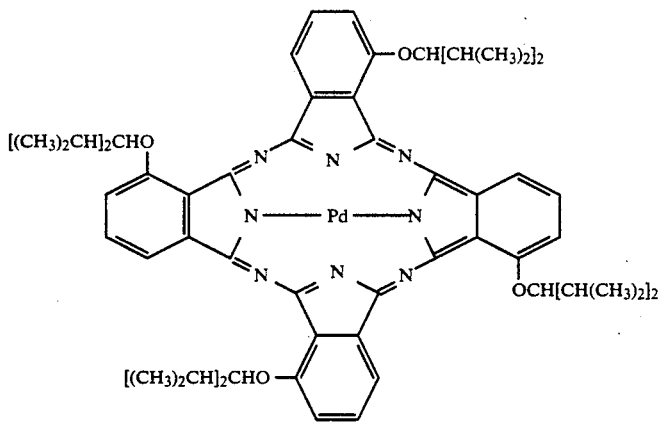

(23)

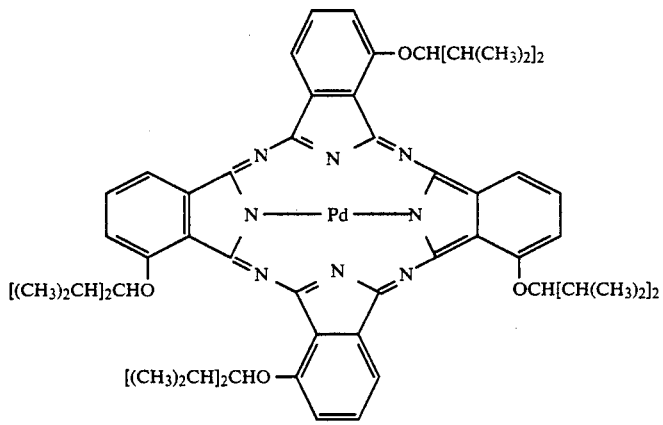

(24)

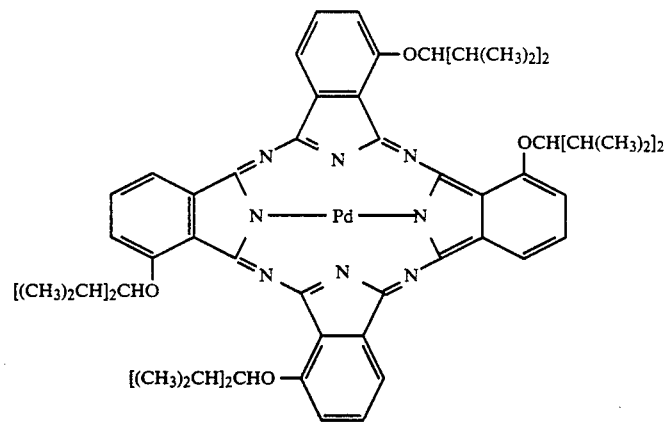

(25)

The yield of the mixture was 92%. The mixture had a maximum absorption wave length $\lambda_{max}$ of 692 nm and $\epsilon_{max}$ of $2.8 \times 10^5 \, g^{-1} cm^2$ (toluene). The production ratio of the isomers was (22)/(23)/(24)/(25)=48/48/2/2 in accordance with an areas ratio on a liquid chromatogram.

EXAMPLE 3

25.6 g (100 mmol) of phthalonitrile represented by the formula (26)

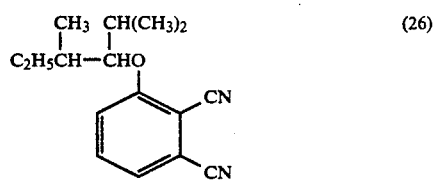

(26)

12.4 g (100 mmol) of DBN and 120 g of n-amyl alcohol were mixed at room temperature, and the mixture was the heated up to 100° C. Next, 5.3 g (30 mmol) of palladium chloride were added thereto at the same temperature, and reaction was then carried out at 100°-110° C. for 12 hours. After cooled to room temperature, the reaction solution was filtered to remove insolubles therefrom, and the resultant filtrate was then concentrated under reduced pressure. Afterward, 400 ml of methanol were added thereto, and the precipitated crystals were filtered and then washed with 100 ml of methanol. Next, the crystals were dried at 60° C. to obtain 25.1 g of a mixture of isomers represented by the formulae (27), (28), (29) and (30):

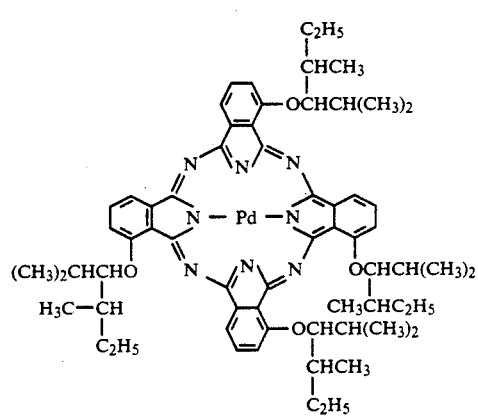
(27)

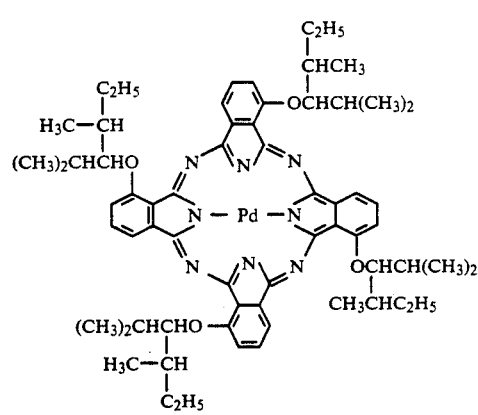
(28)

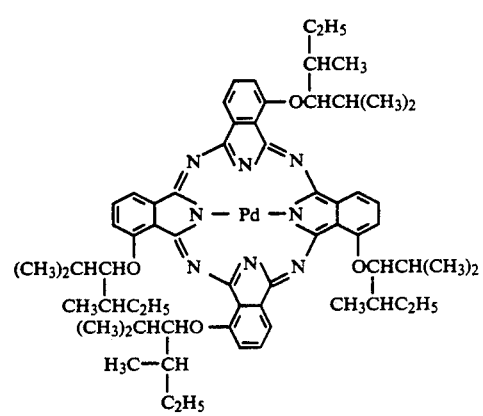
(29)

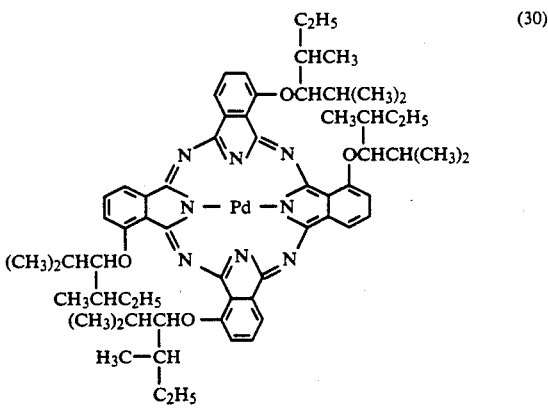
(30)

The yield of the mixture was 89%. the mixture had a maximum absorption wave length $\lambda_{max}$ of 692 nm, and $\epsilon_{max}$ of $2.5 \times 10^5 g^{-1} cm^2$ (toluene). The production ratio of the isomers was (27)/(28)/(29)/(30)=50/48/1/1 in accordance with an area ratio on a liquid chromatogram.

EXAMPLE 4

25.6 g (100 mmol) of phthalonitrile represented by the formula (31)

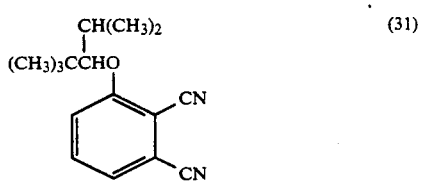
(31)

15.2 g (100 mmol) of DBU and 120 g of 1hexanol were mixed at room temperature, and the mixture was then heated up to 110° C. Next, 5.3 g (30 mmol) of palladium chloride were added thereto at the same temperature, and reaction was then carried out at 100°-110° C. for 12 hours. After cooled to room temperature, the reaction solution was filtered to remove insolubles therefrom, and the resultant filtrate was then concentrated under reduced pressure. Afterward, 400 ml of methanol were added thereto, and the precipitated crystals were filtered and then washed with 100 ml of methanol. Next, the crystals were dried at 60° C. to obtain 25.9 g of a mixture of isomers represented by the formulae (32), (33), (34) and (35):

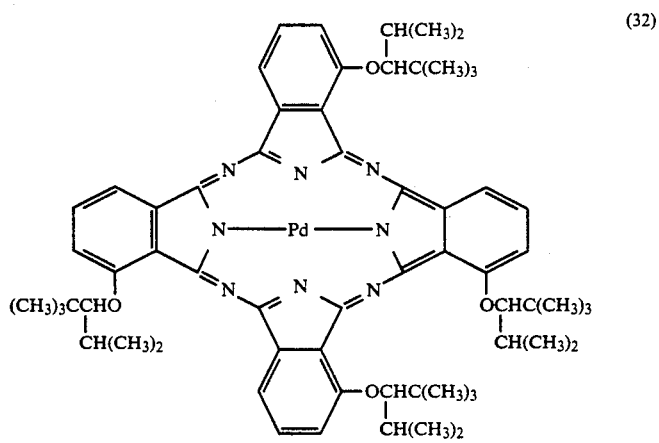
(32)
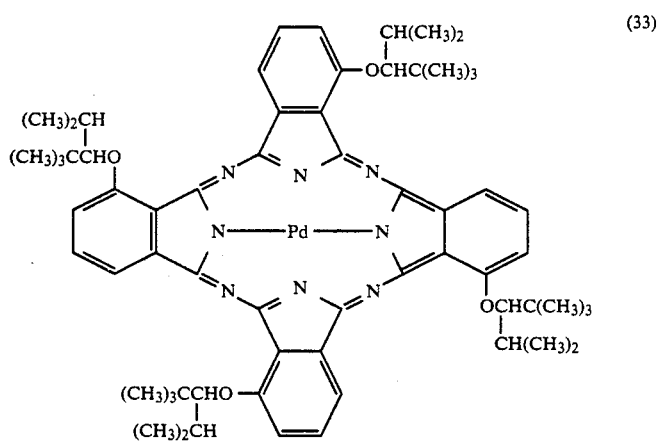
(33)
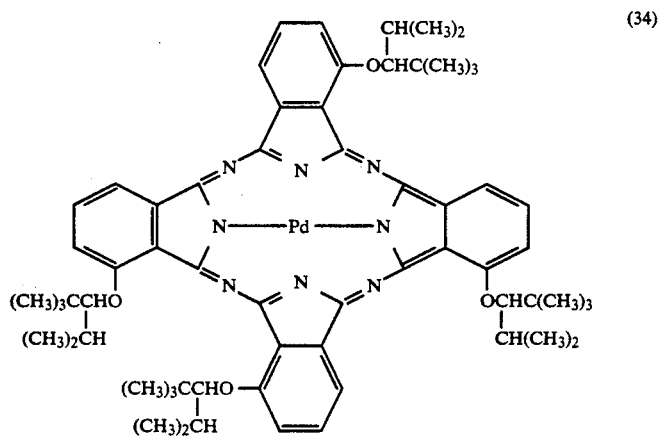
(34)

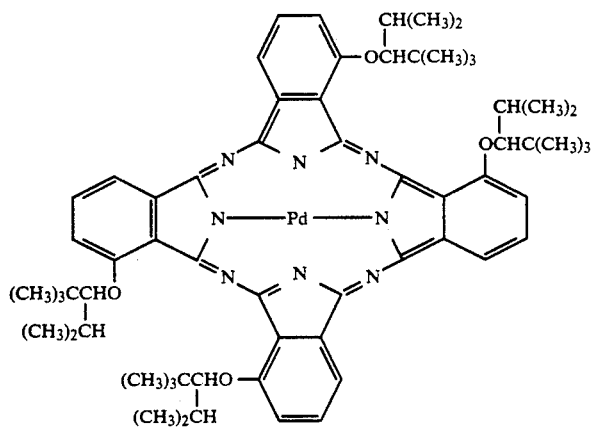

(35)

The yield of the mixture was 92%. The mixture had a maximum absorption wave length $\lambda_{max}$ of 694 nm and $\epsilon_{max}$ of $2.2 \times 10^5 \, g^{-1} cm^2$ (toluene). The production ratio of the isomers was (32)/(33)/(34)/(35)=48/49/2/1 in accordance with an area ratio on a liquid chromatogram.

EXAMPLE 5

18.2 g (79 mmol) of phthalonitrile represented by the formula (36)

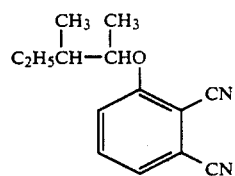

(36)

12.2 g (80 mmol) of DBU and 120 g of 1-hexanol were mixed at room temperature, and the mixture was then heated up to 110° C. Next, 5.3 g (20 mmol) of platinum chloride were added thereto at the same temperature, and reaction was then carried out at 110-120° C. for 17 hours. After cooled to room temperature, the reaction solution was filtered to remove insolubles therefrom, and the resultant filtrate was then concentrated under reduced pressure. Afterward, 300 ml of methanol were added thereto, and the precipitated crystals were filtered and then washed with 100 ml of methanol. Next, the crystals were dried at 60° C. to obtain 17.5 g of a mixture of isomers represented by the formulae (37), (38), (39) and (40):

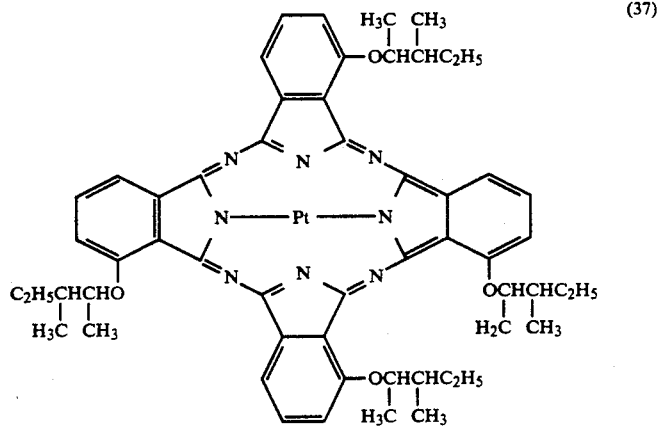

(37)

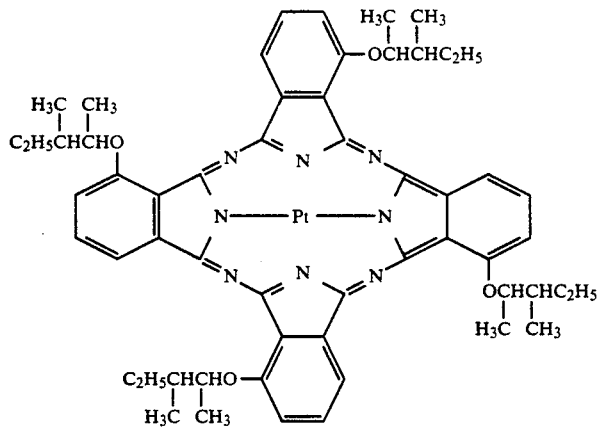

(38)

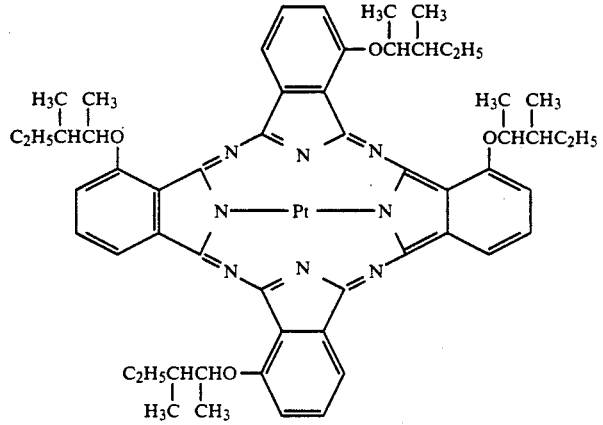

(39)

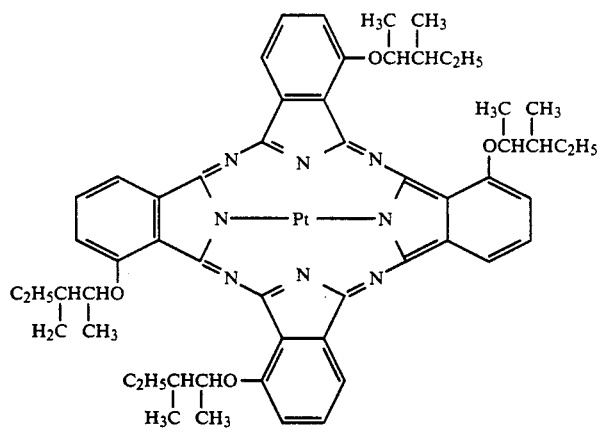

(40)

The yield of the mixture was 80%. The mixture had a maximum absorption wave length $\lambda_{max}$ of 679 nm and $\epsilon_{max}$ of $2.6 \times 10^5$ g$^{-1}$cm$^2$ (toluene). The production ratio of the isomers was (37)/(38)/(39)/(40)=53/43/2/2 in accordance with an area ratio on a liquid chromatogram.

EXAMPLE 6

23.1 g (90 mmol) of phthalonitrile represented by the formula (41)

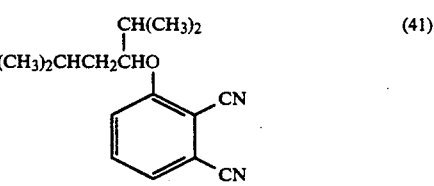

(41)

116.4 g (108 mmol) of DBU and 100 g of n-amyl alcohol were mixed at room temperature, and the mixture was then heated up to 100° C. Next, 3.9 g (25 mmol) of vanadium trichloride were added thereto at the same temperature, and reaction was then carried out at 100°–110° C. for 10 hours. After cooled to room temperature, the reaction solution was filtered to remove insolubles therefrom, and the resultant filtrate was then concentrated under reduced pressure. Afterward, 400 ml of methanol were added thereto, and the precipitated crystals were filtered and then washed with 100 ml of methanol. Next, the crystals were dried at 60° C. to obtain 22.4 g of a mixture of isomers represented by the formulae (42), (43) (44) and (45):

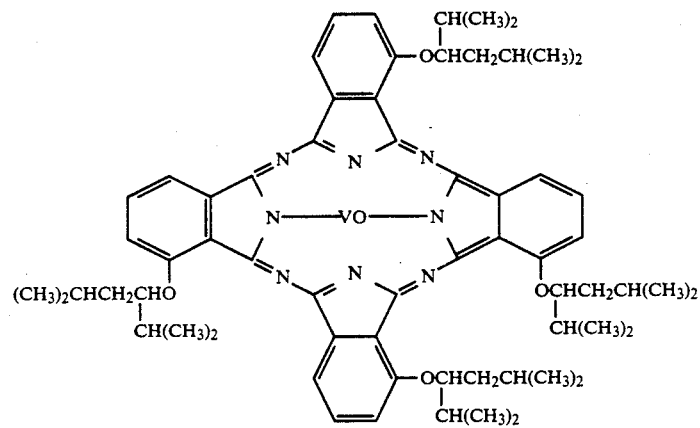

(42)

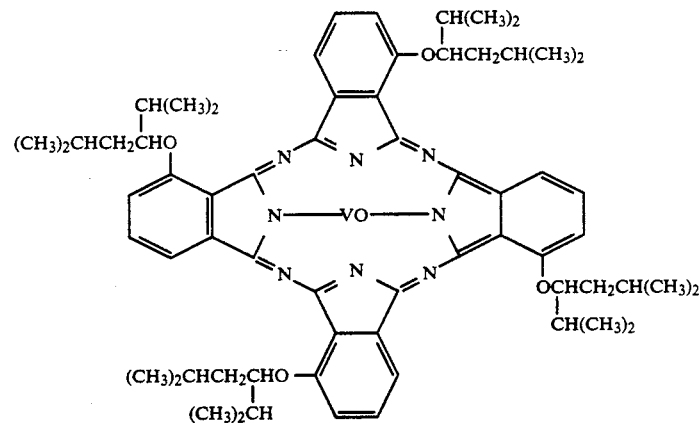

(43)

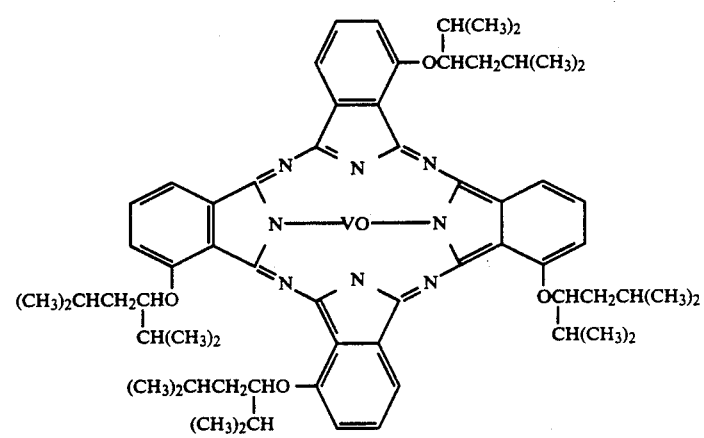

(44)

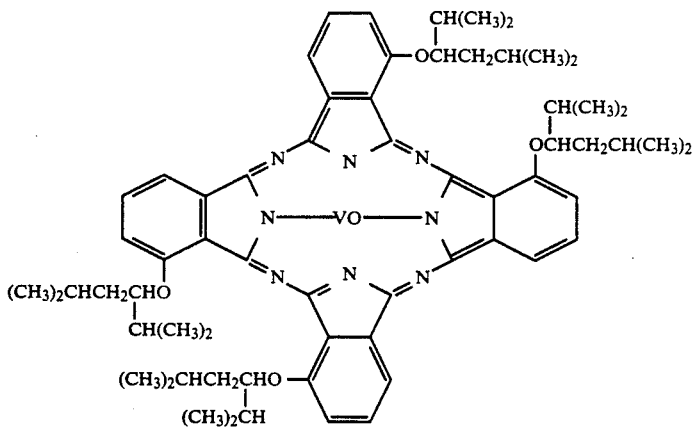
(45)

The yield of the mixture was 91%. The mixture had a maximum absorption wave length $\lambda_{max}$ of 742 nm, and $\epsilon_{max}$ of $1.6 \times 10^5 \, g^{-1}cm^2$ (toluene). The production ratio of the isomers was (42)/(43)/(44)/(45)=51/46/2/1 in accordance with an area ratio on a liquid chromatogram.

EXAMPLE 7

24.2 g (100 mmol) of phthalonitrile represented by the above-mentioned formula (21), 15.2 g (100 mmol) of DBU and 130 g of n-amyl alcohol were mixed at room temperature, and the mixture was then heated up to 95° C. Next, 2.5 g (25 mmol) of copper chloride (I) were added thereto at the same temperature, and reaction was then carried out at 95°–105° C. for 10 hours. After cooled to room temperature, the reaction solution was filtered to remove insolubles therefrom, and the resultant filtrate was then concentrated under reduced pressure. Afterward, 500 ml of methanol were added thereto, and the precipitated crystals were filtered and then washed with 100 ml of methanol. Next, the crystals were dried at 60° C. to obtained 24.0 g of a mixture of isomers represented by the formulae (46), (47), (48) and (49):

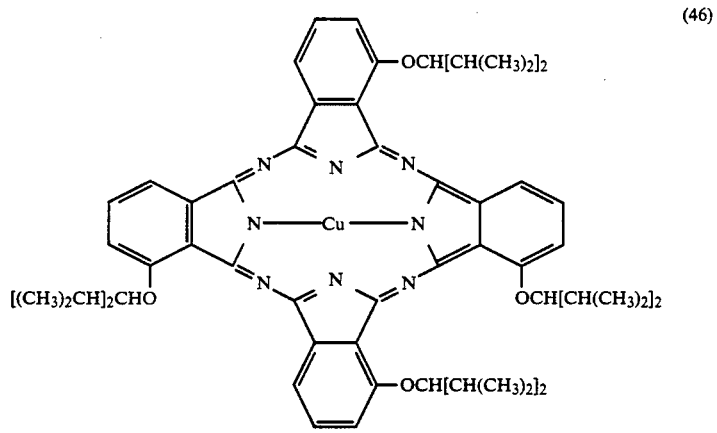
(46)

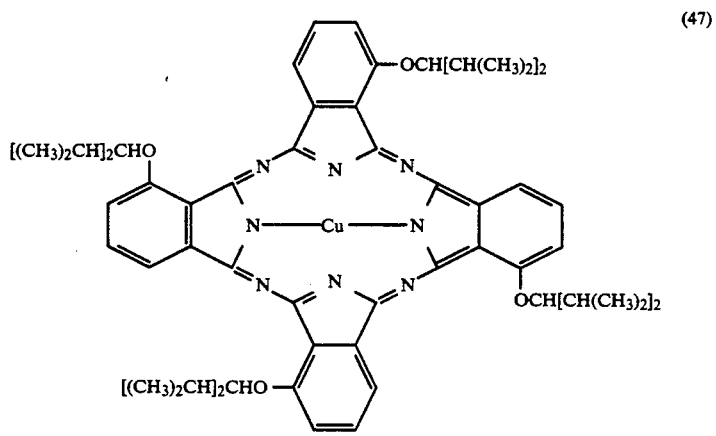
(47)

-continued

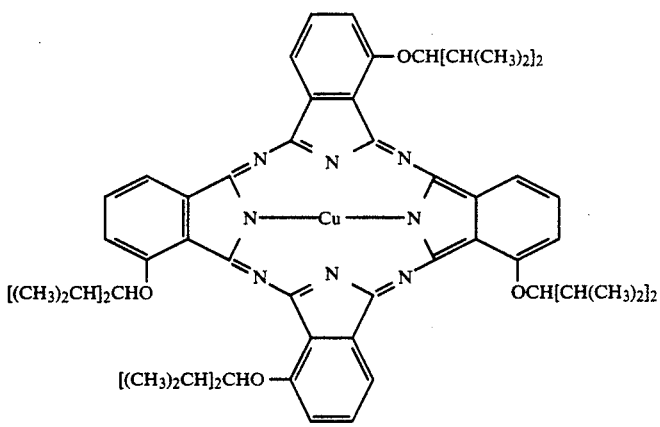
(48)

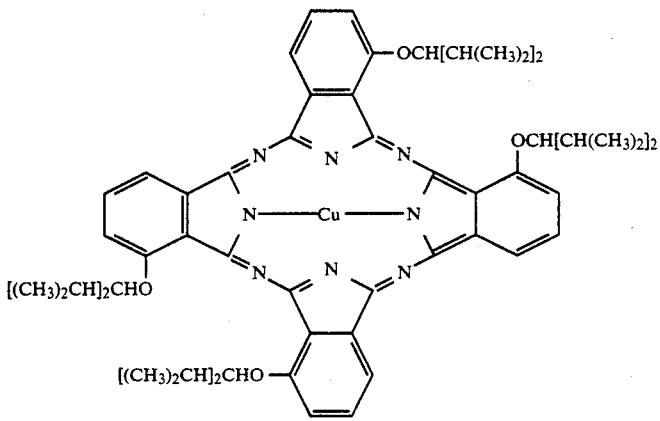
(49)

The yield of the mixture was 93%. The mixture had a maximum absorption wave length $\lambda_{max}$ of 708 nm, and $\epsilon_{max}$ of $2.6 \times 10^5 \mathrm{g^{-1}cm^2}$ (toluene). The production ratio of the isomers was (46)/(47)/(48)/(49)=46/47/4/3 in accordance with an area ratio on a liquid chromatogram.

COMPARATIVE EXAMPLE 1

24.2 g (100 mmol) of phthalonitrile represented by the above-mentioned formula (21), 15.2 g (100 mmol) of DBU, 5.3 g (30 mmol) of palladium chloride and 100 g of 1-hexanol were mixed at room temperature, and the mixture was then heated up to 130° C. Next, reaction was carried out at 130°-140° C. for 12 hours. After cooled to room temperature, the reaction solution was filtered to remove insolubles therefrom, and the resultant filtrate was then concentrated under reduced pressure. Afterward, 400 ml of methanol were added thereto, and the precipitated crystals were filtered and then washed with 100 ml of methanol. Next, the crystals were dried at 60° C. to obtain 13.2 g of a mixture of isomers represented by the above-mentioned formulae (22), (23), (24) and (25). The yield of the mixture was 49%. The mixture had a maximum absorption wave length $\lambda_{max}$ of 692 nm and $\epsilon_{max}$ of $2.8 \times 10^5 \mathrm{g^{-1}cm^2}$ (toluene). The production ratio of the isomers was (22)/(23)/(24)/(25)=41/45/8/6 in accordance with an area ratio on a liquid chromatogram. In addition, a mixture of metal-free phthalocyanines represented by the formula (50) and (51):

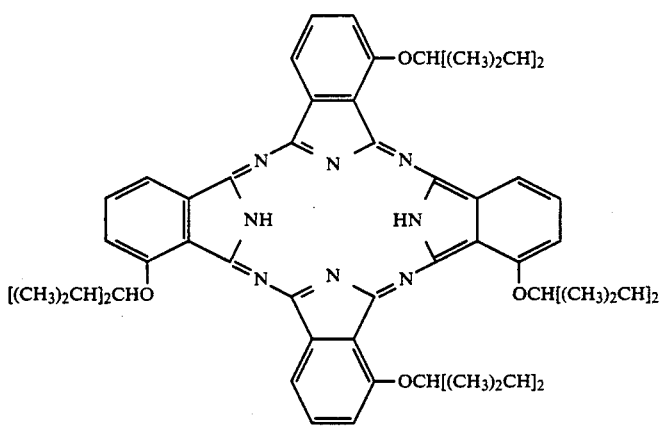

(50)

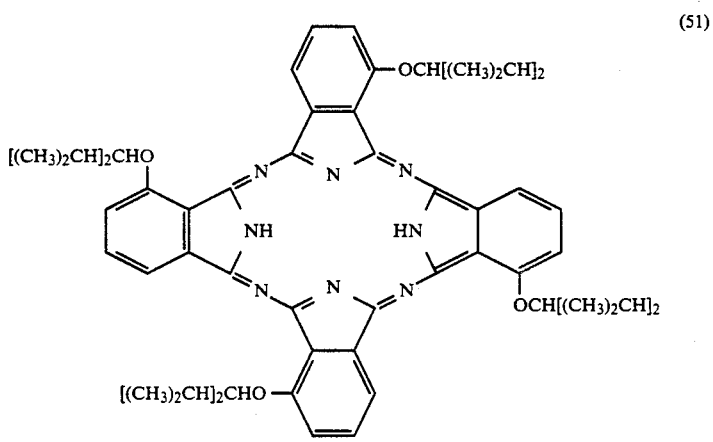

(51)

was formed as by-products in an amount of 22%.

COMPARATIVE EXAMPLE 2

24.2 g (100 mmol) of phthalonitrile represented by the above-mentioned formula (21), 15.2 g (100 mmol) of DBU, 5.3 g (30 mmol) of palladium chloride and 100 g of n-amyl alcohol were mixed at room temperature, and the mixture was then heated up to 75° C. Next, reaction was carried out at 72°–82° C. for 30 hours. After cooled to room temperature, the reaction solution was filtered to remove insolubles therefrom, and the resultant filtrate was then concentrated under reduced pressure. Afterward, 400 ml of methanol were added thereto, and the precipitated crystals were filtered and then washed with 100 ml of methanol. Next, the crystals were dried at 60° C. to obtain 8.6 g of a mixture of isomers represented by the above-mentioned formulae (22), (23), (24) and (25). The yield of the mixture was 32%. The mixture had a maximum absorption wave length $\lambda_{max}$ of 692 nm and $\epsilon_{max}$ of $2.8 \times 10^5$ g$^{-1}$cm$^2$ (toluene). The production ratio of the isomers was (22)/(23)/(24)/(25)=41/51/4/4 in accordance with an area ratio on a liquid chromatogram.

EXAMPLE 8

37.56g (145 mmol) of a diiminoisoindoline represented by the formula (52)

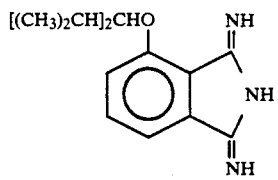

(52)

6.38 g (36 mmol) of palladium chloride, 22.07 g (145 mmol) of DBU and 300 ml of 1-octanol were mixed at room temperature, and the mixture was then heated up to a reflux temperature in 30 minutes. Next, reaction was carried out under reflux for 5 hours, cooled to room temperature, and then poured into 1000 ml of methanol. The precipitated crystals were filtered and then washed with 300 ml of methanol. Afterward, the crystals were dried at 60° C. to obtain 35.8 g of a mixture of isomers represented by the formulae (22), (23), (24) and (25). The yield of the mixture was 92%. The mixture had a maximum absorption wave length $\lambda_{max}$ of 692 nm and $\epsilon_{max}$ of $2.7 \times 10^5$ g$^{-1}$cm$^2$/toluene The production ratio of the isomers was (22)/(23)/(24)/(25)=86/9/3/2 in accordance with an area ratio on a liquid chromatogram.

EXAMPLE 9

37.56 g (145 mmol) of a diiminoisoindoline represented by the above-mentioned formula (52), 6.38 g (36 mmol) of palladium chloride and 300 ml of 1-octanol were mixed at room temperature, and the mixture was then heated up to a reflux temperature in 30 minutes.

Next, reaction was carried out under reflux for 5 hours, cooled to room temperature, and then poured into 1000 ml of methanol. The precipitated crystals were filtered and then washed with 300 ml of methanol. Afterward, the crystals were dried at 60° C. to obtain 29.1 g of a mixture of isomers represented by the formulae (22), (23), (24) and (25) in a ratio of 75/18/5/2. The yield of the mixture was 75%. The mixture had a maximum absorption wave length $\lambda_{max}$ of 692 nm and $\epsilon_{max}$ of $2.7 \times 10^5$ g$^{-1}$cm$^2$/toluene.

EXAMPLE 10

37.56 g (145 mmol) of a diiminoisoindoline represented by the above-mentioned formula (52), 6.38 g (36 mmol) of palladium chloride and 300 ml of 1-octanol were mixed at room temperature, and the mixture was then heated up to 180° C. in 30 minutes. Next, 22.07 g (145 mmol) of DBU were added dropwise thereto at 180° C., and the mixture was then heated up to a reflux temperature. Afterward, reaction was carried out under reflux for 5 hours, cooled to room temperature, and then poured into 1000 ml of methanol. The precipitated crystals were filtered and then washed with 300 ml of methanol. Afterward, the crystals were dried at 60° C. to obtain 35.4 g of a mixture of isomers represented by the formulae (22), (23), (24) and (25) in a ratio of 76/17/4/3. The yield of the mixture was 91%. The mixture had a maximum absorption wave length $\lambda_{max}$ of 692 nm and $\epsilon_{max}$ of $2.7 \times 10^5$ g$^{-1}$cm$^2$/toluene

EXAMPLE 11

9.83 g (36 mmol) of a diiminoisoindoline represented by the formula (53)

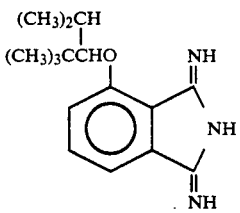

(53)

1.59 g (9 mmol) of palladium chloride, 5.47 g (36 mmol) of DBU and 50 ml of 1-hexanol were mixed at room temperature, and reaction was then carried out under reflux for 10 hours. Next, the mixture was cooled to room temperature and then poured into 200 ml of methanol. The precipitated crystals were filtered and then washed with 100 ml of methanol. Afterward, the crystals were dried at 60° C. to obtain 11.6 g of a mixture of isomers represented by the formulae (32), (33), (34) and (35) in a ratio of 86/7/4/2. The yield of the mixture was 89%. The mixture had a maximum absorption wave length $\lambda_{max}$ of 695 nm and $\epsilon_{max}$ of $2.4 \times 10^5$ g$^{-1}$cm$^2$/toluene

EXAMPLE 12

9.83 g (36 mmol) of a diiminoisoindoline represented by the above-mentioned formula (53), 1.59 g (9 mmol) of palladium chloride and 50 ml of 1-heptanol were mixed at room temperature. Next, 5.47 g (36 mmol) of DBU were added dropwise thereto at 150° C., and the mixture was then heated up to a reflux temperature. Afterward, reaction was carried out under reflux for 8 hours, cooled to room temperature, and then poured into 200 ml of methanol. The precipitated crystals were filtered and then washed with 100 ml of methanol. Then, the crystals were dried at 60° C. to obtain 11.7 g of a mixture of isomers represented by the formulae (32), (33), (34) and (35) in a ratio of 75/21/3/1. The yield of the mixture was 90%. The mixture had a maximum absorption wave length $\lambda_{max}$ of 695 nm and $\epsilon_{max}$ of $2.4 \times 10^5$ g$^{-1}$cm$^2$/toluene.

EXAMPLE 13

9.83 g (36 mmol) of a diiminoisoindoline represented by the formula (54)

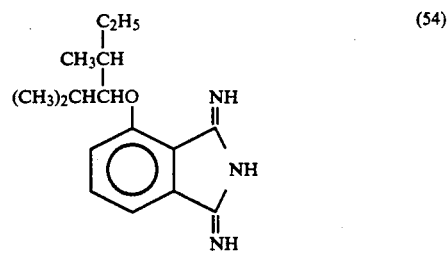

(54)

1.59 g (9 mmol) of palladium chloride, 5.47 g (36 mmol) of DBU and 50 ml of 1-octanol were mixed at room temperature. Afterward, reaction was carried out under reflux for 5 hours, cooled to room temperature, and then poured into 200 ml of methanol. The precipitated crystals were filtered and then washed with 100 ml of methanol. Next, the crystals were dried at 60° C. to obtain 12.0 g of a mixture of isomers represented by the formulae (27), (28), (29) and (30) in a ratio of 90/5/3/2. The yield of the mixture was 92%. The mixture had a maximum absorption wave length $\lambda_{max}$ of 692 nm and $\epsilon_{max}$ of $2.5 \times 10^5$ g$^{-1}$cm$^2$/toluene.

EXAMPLE 14

8.82 g (36 mmol) of a diiminoisoindoline represented by the formula (55)

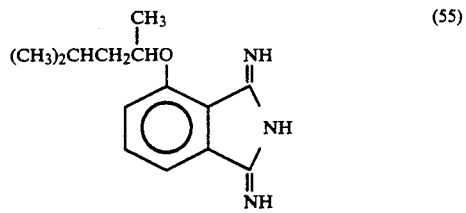

(55)

1.59 g (9 mmol) of palladium chloride, 5.47 g (36 mmol) of DBU and 50 ml of 1-hexanol were mixed at room temperature. Afterward, the mixture was reacted under reflux for 10 hours, cooled to room temperature, and then poured into 200 ml of methanol. The precipitated crystals were filtered and then washed with 100 ml of methanol. Afterward, the crystals were dried at 60° C. to obtain 11.2 g of a mixture of isomers represented by the formulae (17), (18), (19) and (20) in a ratio of 87/9/1/2. The yield of the mixture was 93%. The mixture had a maximum absorption wave length $\lambda_{max}$ of 687 nm and $\epsilon_{max}$ of $2.9 \times 10^5$ g$^{-1}$cm$^2$/toluene.

EXAMPLE 15

9.32 g (36 mmol) of a diiminoisoindoline represented by the above-mentioned formula (52), 0.89 g (9 mmol) of cuprous chloride, 5.47 g (36 mmol) of DBU and 50 ml of 1-hexanol were mixed at room temperature. Afterward, reaction was carried out under reflux for 10 hours, cooled to room temperature, and then poured into 200 ml of methanol. The precipitated crystals were filtered and then washed with 100 ml of methanol. Next, the crystals were dried at 60° C. to obtain 10.44 g of a mixture of isomers represented by the formulae (46), (47), (48) and (49) in a ratio of 85/15/0/0. The yield of the mixture was 95%. The mixture had a maximum absorption wave length $\lambda_{max}$ of 708 nm and $\epsilon_{max}$ of $2.8 \times 10^5$ g$^{-1}$cm$^2$/toluene.

EXAMPLE 16

9.32 g (36 mmol) of a diiminoisoindoline represented by the formula (52), 0.89 g (9 mmol) of cobalt chloride, 5.47 g (36 mmol) of DBU and 50 ml of 1-hexanol were mixed at room temperature. Afterward, reaction was carried out under reflux for 12 hours, cooled to room temperature, and then poured into 200 ml of methanol. The precipitated crystals were filtered and then washed with 100 ml of methanol. Afterward, the crystals were dried at 60° C. to obtain 10.44 g of a mixture of isomers represented by the formulae (56), (57), (58) and (59)

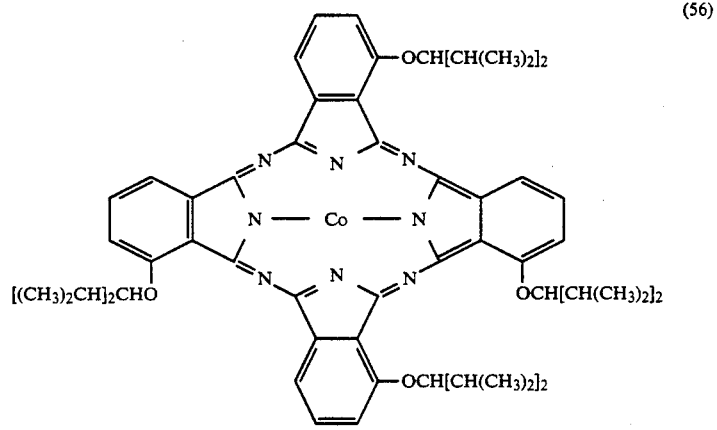
(56)

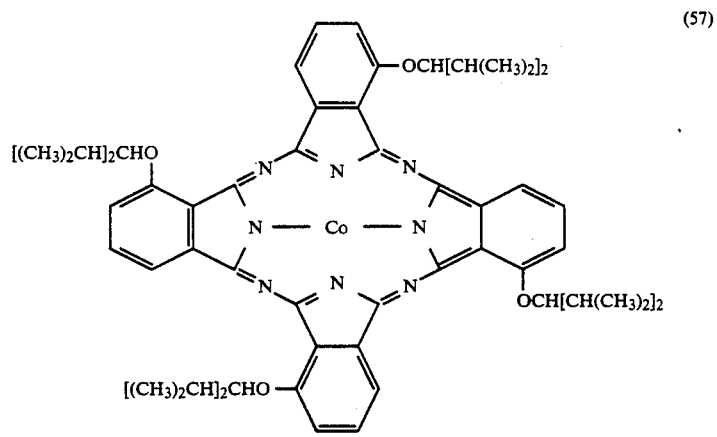
(57)

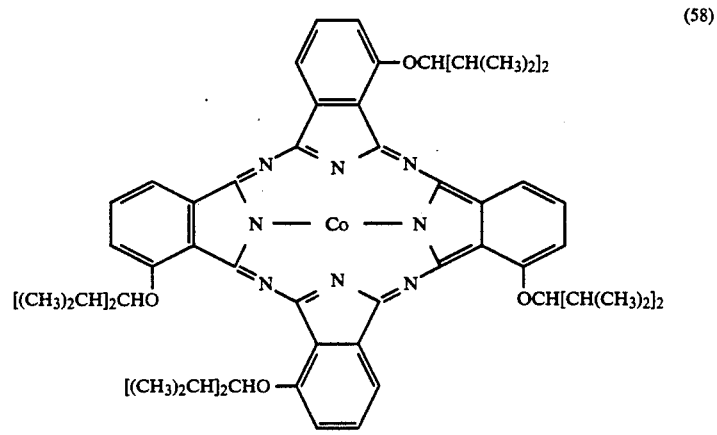
(58)

-continued (59)

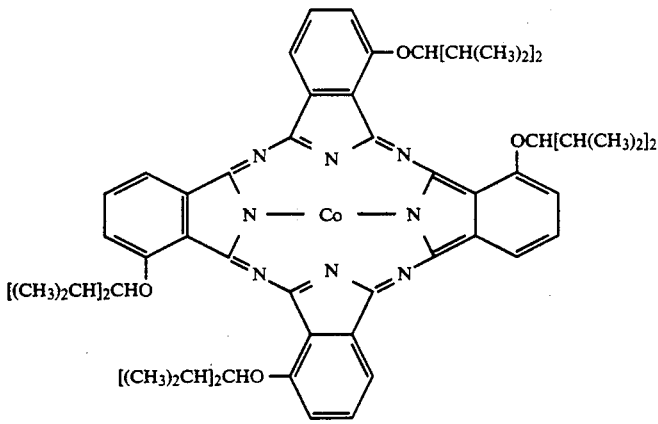

in a ratio of 89/9/1/1. The yield of the mixture was 95%. The mixture had a mixture absorption wave length $\lambda_{max}$ of 708 nm and $\epsilon_{max}$ of $2.8 \times 10^5$ g$^{-1}$cm$^2$/toluene.

EXAMPLE 17

19.4 g (79 mmol) of a diiminoisoindoline represented by the formula (60)

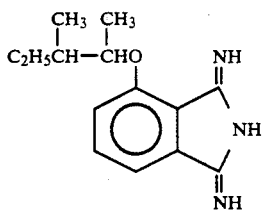
(60)

5.3 g (20 mmol) of platinum chloride, 12.2 g (80 mmol) of DBU and 120 ml of 1-hexanol were mixed at room temperature. Afterward, the mixture was reacted under reflux for 17 hours, cooled to room temperature, and then poured into 500 ml of methanol. The precipitated crystals were filtered and then washed with 100 ml of methanol. Afterward, the crystals were dried at 60° C. to obtain 17.5 g of a mixture of isomers represented by the formulae (37), (38), (39) and (40). The yield of the mixture was 80%. The mixture had a maximum absorption wave length $\lambda_{max}$ of 679 nm and $\epsilon_{max}$ of $2.6 \times 10^5$ g$^{-1}$cm$^2$ (toluene). The production ratio of the isomers was (37)/(38)/(39)/(40)=86/10/2/2 in accordance with an area ratio on a liquid chromatogram.

EXAMPLE 18

20.5 g (90 mmol) of a diiminoisoindoline represented by the above-mentioned formula (55), 3.9 g (25 mmol) of vanadium trichloride, 16.4 g (108 mmol) of DBU and 100 ml of 1-octanol were mixed at room temperature. Afterward, the mixture was reacted under reflux for 10 hours, cooled to room temperature, and then poured into 400 ml of methanol. The precipitated crystals were filtered and then washed with 100 ml of methanol. Next, the crystals were dried at 60° C. to obtain 22.4 g of a mixture of isomers represented by the formulae (42), (43), (44) and (45) in a ratio of 90/7/2/1. The yield of the mixture was 91%. The mixture had a maximum absorption wave length $\lambda_{max}$ of 742 nm and $\epsilon_{max}$ of $1.6 \times 10^5$ g$^{-1}$cm$^2$/toluene.

COMPARATIVE EXAMPLE 3

7.77 g (30 mmol) of a diiminoisoindoline represented by the above-mentioned formula (52), 1.59 g (9 mmol) of palladium chloride, 4.56 g (30 mmol) of DBU and 60 ml of n-amyl alcohol were mixed at room temperature. Afterward, the mixture was heated up to a reflux temperature in 30 minutes and reaction was then carried out under reflux for 30 hours. Next, the reaction mixture was cooled to room temperature, and insolubles were removed by filtration and the resultant filtrate was then poured into 200 ml of methanol. The precipitated crystals were filtered and then washed with 100 ml of methanol. The crystals were then dried at 60° C. to obtain 1.8 g of a mixture of isomers represented by the formulae (22), (23), (24) and (25) in a ratio of 87/10/2/1. The yield of the mixture was 23%. The mixture had a maximum absorption wave length $\lambda_{max}$ of 692 nm and $\epsilon_{max}$ of $2.7 \times 10^5$ g$^{-1}$cm$^2$/toluene. The insolubles were unreacted raw materials.

COMPARATIVE EXAMPLE 4

9.32 g (36 mmol) of a diiminoisoindoline represented by the above-mentioned formula (52), 0.89 g (9 mmol) of cuprous chloride, 5.47 g (36 mmol) of DBU and 50 ml of 1-hexanol were mixed at room temperature, and reaction was then carried out at 130° C. for 26 hours. Next, the reaction mixture was cooled to room temperature, and insolubles were removed by filtration and the resultant filtrate was then poured into 200 ml of methanol. Afterward, the precipitated crystals were filtered and then washed with 100 ml of methanol. The crystals were then dried at 60° C. to obtain 2.6 g of a mixture of isomers represented by the formulae (46), (47), (48) and (49) in a ratio of 71/20/5/4. The yield of the mixture was 24%. The mixture had a maximum absorption wave length $\lambda_{max}$ of 708 nm and $\epsilon_{max}$ of $2.8 \times 10^5$ g$^{-1}$cm$^2$/toluene The insolubles were unreacted raw materials.

What is claimed is:

1. A method for preparing an alkoxyphthalocyanine represented by the formula (3):

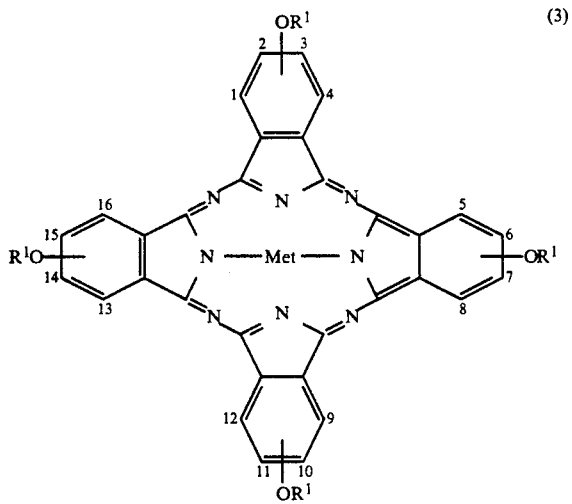

(3)

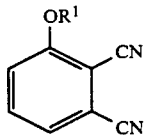

(2)

wherein each of R¹s is independently a secondary alkyl group having 3 to 20 carbon atoms, Met is a divalent metal atom or a metal oxide selected from the group consisting of VO and TiO₂, and the substitution positions of —OR¹s are the 1- or 4-position, the 5- or 8-position, the 9- or 12 position and the 13- or 16-position, which comprises the steps of heating an alcohol solution or suspension of one to four kinds of 3-alkoxyphthalonitriles represented by the formula (2):

wherein R¹ is a secondary alkyl group having 3 to 20 carbon atoms, and an organic base to 90°–120° C., thereafter adding a metal selected from the group consisting of Ti, V, Mn, Fe, Co, Ni, Cu, Zn, Ru, Rh, Pb, Pd, and Pt and halides thereof, acetates thereof, sulfates thereof, nitrates thereof, carboxylates thereof, carbonylates thereof, and oxides thereof at the same temperature, and then reacting them at 90°–120° C.

2. The method for preparing an alkoxyphthalocyanine according to claim 1 wherein said metal derivative is a palladium halide, palladium acetate, a platinum halide or platinum acetate.

3. The method for preparing an alkoxyphthalocyanine according to claim 2 wherein R¹ in said formulae (2) and (3) is selected from the group consisting of a 1,3-dimethylbutyl group, 1,2-dimethylbutyl group, 2-methyl-1-iso-propylpropyl group, 1-ethyl-3-methylbutyl group, 3-methyl-1-iso-propylbutyl group, 2-methyl-1-isopropylbutyl group and 1-t-butyl-2-methylpropyl group.

4. The method for preparing an alkoxyphthalocyanine according to claim 3 wherein the amount of a solvent to be used is 1 to 100 times as much as that of said phthalonitrile.

5. The method for preparing an alkoxyphthalocyanine according to claim 4 wherein said organic base is 1,8-diazabicyclo[4.4.0]-7-undecene or 1,5-diazabicyclo-[4.3.0]-5-nonene.

6. The method for preparing an alkoxyphthalocyanine according to claim 5 wherein said prepared phthalocyanine is a mixture of isomers represented by the formulae (7) and (8):

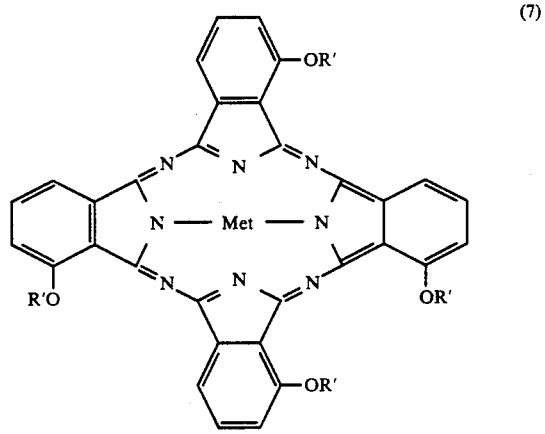

(7)

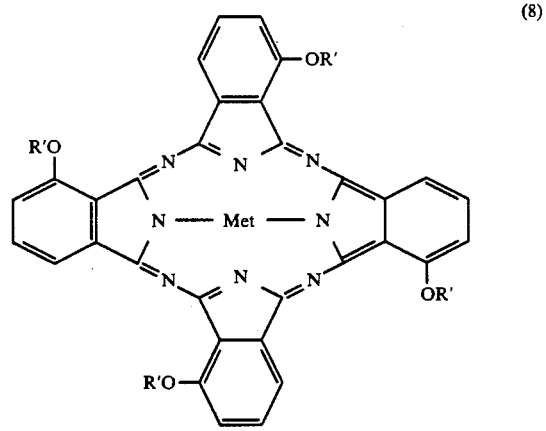

(8)

wherein R¹ and Met are identical with R¹ and Met in the above-mentioned formula (3), and ratio between these isomers (7) and (8 is from 60/40 to 40/60.

* * * * *